(12) United States Patent
Kumar et al.

(10) Patent No.: US 8,213,745 B2
(45) Date of Patent: Jul. 3, 2012

(54) SEAM CARVING FOR IMAGE RESIZING

(75) Inventors: Mrityunjay Kumar, Rochester, NY (US); David D. Conger, Grosse Point Woods, MI (US); Jiebo Luo, Pittsford, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 383 days.

(21) Appl. No.: 12/576,260

(22) Filed: Oct. 9, 2009

(65) Prior Publication Data

US 2011/0085745 A1    Apr. 14, 2011

(51) Int. Cl.
*G06K 9/32* (2006.01)
*G06K 9/36* (2006.01)

(52) U.S. Cl. ........................ 382/298; 382/276

(58) Field of Classification Search .................. 382/298, 382/162, 254, 300, 276; 358/1.9, 3.05, 3.06
See application file for complete search history.

(56) References Cited

U.S. PATENT DOCUMENTS

| | | | |
|---|---|---|---|
| 2008/0219587 A1 | 9/2008 | Avidan et al. | |
| 2008/0267528 A1 | 10/2008 | Avidan et al. | |
| 2009/0180713 A1 | 7/2009 | Bucha et al. | |
| 2010/0027876 A1* | 2/2010 | Avidan et al. | 382/162 |
| 2010/0079813 A1* | 4/2010 | Bernal et al. | 358/3.06 |
| 2011/0200274 A1* | 8/2011 | Luo et al. | 382/300 |

OTHER PUBLICATIONS

Suh et al., "Automatic thumbnail cropping and its effectiveness." Proceedings of the 16th annual ACM symposium on User Interface Software and Technology, pp. 95-104, 2003.
Chen et al., "A visual attention model for adapting images on small displays," Multimedia Systems, vol. 9, pp. 353-364, 2003.
Santella et al., "Gaze-based interaction for semiautomatic photo cropping," ACM Human Factors in Computing Systems, pp. 771-780, 2006.
Gal et al., "Feature aware texturing," Proc. Eurographics Symposium on Rendering, 2006.
Agarwala et al., "Interactive digital photomontage," ACM Trans. Graph. vol. 23, pp. 294-302, 2004.
Jia et al., "Drag-and-drop pasting," ACM Transactions on Graphics, vol. 25, pp. 631-636, 2006.
Rother et al., "Autocollage," ACM Transactions on Graphics, vol. 25, pp. 847-852, 2006.
S. Avidan, et al., "Seam carving for content-aware image resizing," ACM Transactions on Graphics, vol. 26, No. 3, 2007.
Y. Guo et al., "Image retargeting using mesh parameterization," (IEEE Transactions on Multimedia, vol. 11, pp. 856-867, 2009.
D. Simakov, et al., "Summarizing visual data using bidirectional similarity," Proc. IEEE Conference on Computer Vision and Pattern Recognition, pp. 1-8, 2008.

\* cited by examiner

*Primary Examiner* — Yon Couso
(74) *Attorney, Agent, or Firm* — Kevin E. Spaulding

(57) ABSTRACT

A method for modifying an input digital image having input dimensions defined by a number of input rows and input columns to form an output digital image where the number of rows or columns is reduced by one, comprising an image energy map determined from the input image; determining a seam path responsive to the image energy map; imposing constraints on the seam path; and removing pixels along the seam path to modify the input digital image.

10 Claims, 5 Drawing Sheets

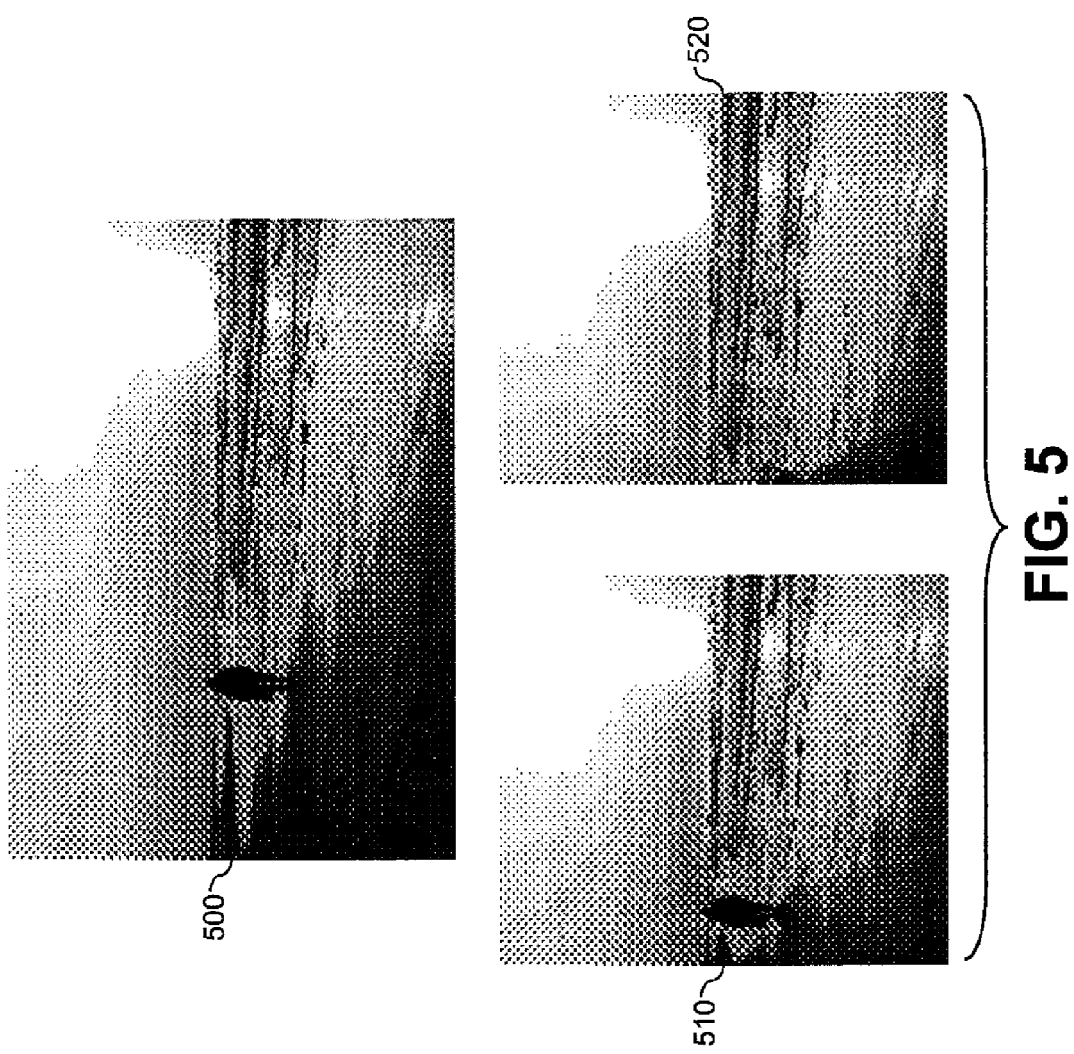

SEAM CARVING FOR IMAGE RESIZING

FIELD OF THE INVENTION

This invention relates generally to the field of resizing digital images, and more particularly to a method to resize images using a seam carving algorithm.

BACKGROUND OF THE INVENTION

The rise of print and display devices ranging from tiny "thumbprints" of images often seen in selection menus, small, low resolution mobile telephone screens, slightly larger PDA screens, to large, high resolution elongated flat panel display and projector screens has made image resizing an important technique for rendering and viewing digital images. Resizing images to render them on different devices than originally intended is sometimes called image retargeting.

Conventional image retargeting typically involves image scaling and cropping. Image scaling magnifies or shrinks the size of the image to resize the image. Generally, the same scale factor is applied in both the horizontal and vertical directions, which preserves the aspect ratio of the image. Image scaling alone does not work well when the aspect ratio of the image needs to change, because applying different scale factors in the horizontal and vertical directions introduces visual distortions.

Cropping is another method to resize an image by cutting out a subset of pixels within the image. Generally, image scaling is combined with cropping when the aspect ratio of an image needs to be changed. In this case, the image is scaled so that it has the right size in one dimension, but is oversized in the other direction. The scaled image is then cropped to obtain an output image of the desired size.

Many resizing algorithms default to cropping the output image from the central portion of the input image, discarding equal portions of the input image on both edges. However, this can result in discarding important parts of the image depending on the content of the image. While cropping an image, there is a desire to maintain important features in the content of the image. This can be done with top-down or bottom-up methods. Top-down methods use tools such as face detectors to detect important regions in the image, whereas bottom-up methods rely on visual saliency methods to construct visual saliency map of the source image. After the saliency map is constructed, cropping can be used to display the most important region of the image.

One method described by Suh et al., in the article "Automatic thumbnail cropping and its effectiveness" (Proceedings of the 16th annual ACM symposium on User Interface Software and Technology, pp. 95-104, 2003) automatically generates thumbnail images based on either a saliency map or the output of a face detector. With this method, a source image is cropped to capture the most salient region in the image.

Another method taught by Chen et al. in the article "A visual attention model for adapting images on small displays" (Multimedia Systems, Vol. 9, pp. 353-364, 2003) adapts images to mobile devices. In this method, the most important region in the image is automatically detected and transmitted to the mobile device.

Santella et al., in the article "Gaze-based interaction for semiautomatic photo cropping" (ACM Human Factors in Computing Systems, pp. 771-780, 2006), which is incorporated herein by reference, use eye tracking, in addition to composition rules to crop images intelligently. In this method, a users looks at an image, while eye movements are recorded. The recordings are used to identify important image content, and can then automatically crop the image to any size or aspect ratio.

All of the above rely on conventional image resizing and cropping operations to retarget of the image. These approaches are limited because it can only remove pixels from the image periphery. In some cases, there may be important image content at the edges of the image that will be lost during the cropping operation no matter how the image is cropped. More effective resizing can only be achieved by considering the image content as a whole, in conjunction with geometric constraints of the output device.

Another method taught by Gal et al. in the article "Feature aware texturing" (Proc. Eurographics Symposium on Rendering, 2006) uses a feature-aware texture mapping that warps an image to a new shape, while preserving user-specified regions. This is accomplished by solving a particular formulation of the Laplace editing technique suited to accommodate similarity constraints in images. However, local constraints are propagated through the entire image to accommodate all constraints at once, and may sometimes fail.

Another method taught by Agarwala et al. in the article "Interactive digital photomontage" (ACM Trans. Graph. Vol. 23, pp. 294-302, 2004) composes a novel photomontage from several images. A user selects ROIs from different input images, which are then composited into an output image.

One rather elegant content-aware image retargeting algorithm called "seam carving" has been described by S. Avidan and A. Shamir in U.S. Patent Application Publication 2008/0219587, entitled "Method for retargeting images." The seam carving technique provides a way to systematically remove pixels from visually "unimportant" paths ("seams") through an image, effectively reducing the height or width by one pixel at a time, in a relatively unnoticeable way. Similarly, pixels can be added to these paths to achieve an increase in the dimension. However, this approach fails if seam passes through the important objects in the image.

Another method using mesh parameterization has been described by Y. Guo et al. in the article "Image retargeting using mesh parameterization," (IEEE Transactions on Multimedia, Vol. 11, pp. 856-867, 2009). In this approach, a mesh image representation that is consistent with the underlying image structures is constructed for image retargeting. This technique requires processing an entire image at once which may be too complex and too costly for many applications.

Another method described by D. Simakov, et al. in the article "Summarizing visual data using bidirectional similarity" (Proc. IEEE Conference on Computer Vision and Pattern Recognition, pp. 1-8, 2008) uses a similarity measure. In this approach, an image similarity measure is optimized for image retargeting. This technique requires processing an entire image at once which may be too complex and too costly for many applications.

Thus, there exists a need for content-aware image retargeting that preserves salient features of an image even under arbitrary changing of the aspect ratio.

SUMMARY OF THE INVENTION

The present invention represents a method for modifying an input digital image having input dimensions defined by a number of input rows and input columns to form an output digital image where the number of rows or columns is reduced by one, comprising using a processor to perform the steps of a) selecting either a horizontal seam direction to remove a row or a vertical seam direction to remove a column;

b) determining an image energy map for the input image;

c) defining a gradient threshold;

d) determining a seam path responsive to the image energy map, where the seam path is constrained such that a directional image gradient computed in a direction perpendicular to either the seam path or the seam direction is constrained to be less than the gradient threshold for each pixel in the seam path; and e) determining an output digital image by removing pixels along the seam path.

It is an advantage that by constraining the seam path, the retargeted image preserves the salient features of the original image with improved accuracy.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which:

FIG. 5 shows images comparing the results obtained according to an embodiment of the present invention with those obtained using an alternate technique.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
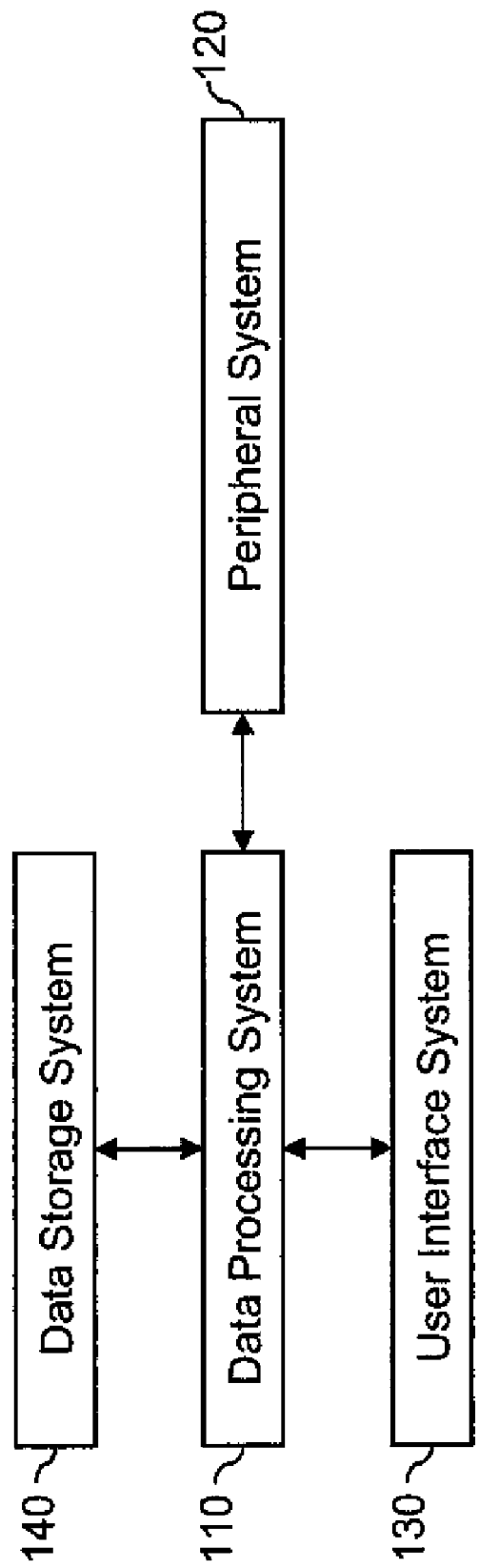
FIG. 1 is a high-level diagram showing the components of a system for retargeting digital image according to an embodiment of the present invention.

FIG. 1 is a high-level diagram showing the components of a system for image retargeting according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

Figure 2:
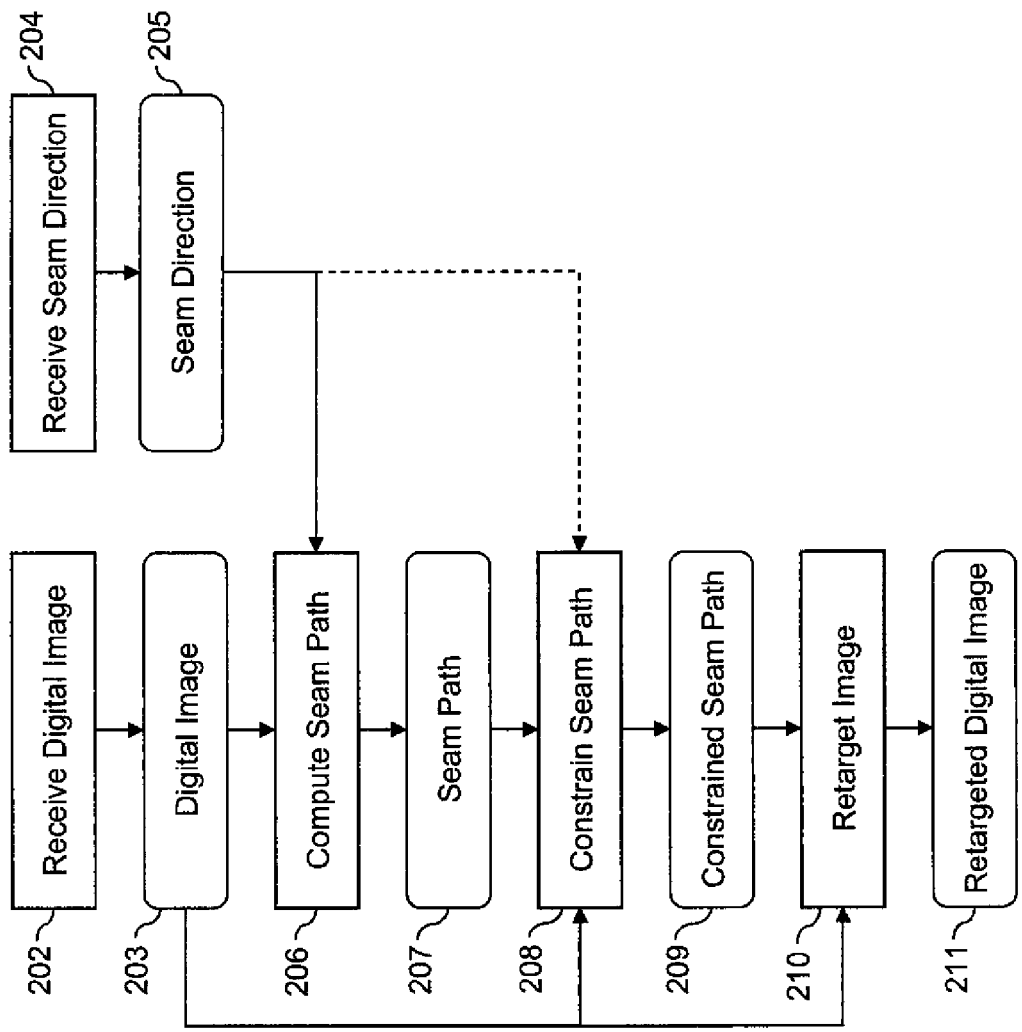
FIG. 2 is a flow diagram illustrating a method for retargeting digital images according to an embodiment of the present invention.
Figure 3:
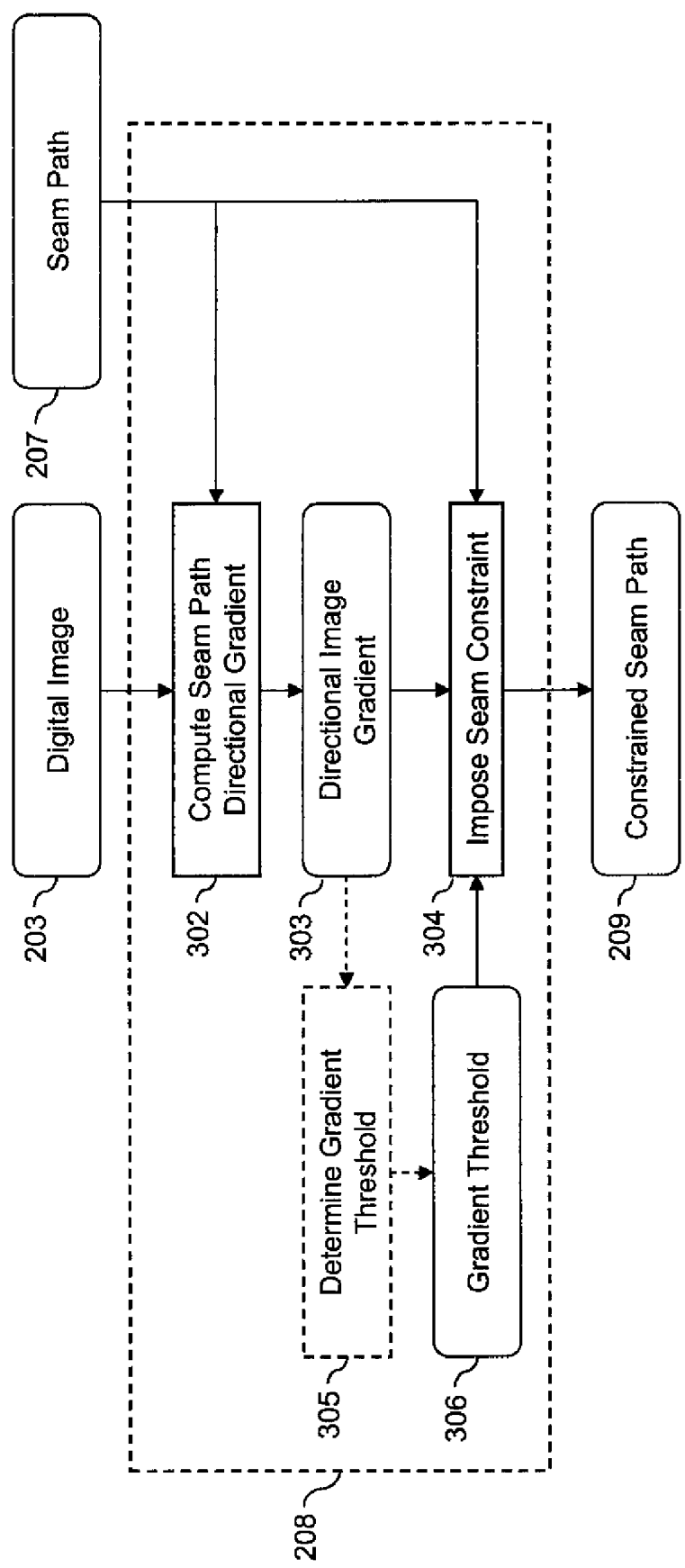
FIG. 3 is a block diagram showing a detailed view of the constrain seam path step of FIG. 2.
Figure 4:
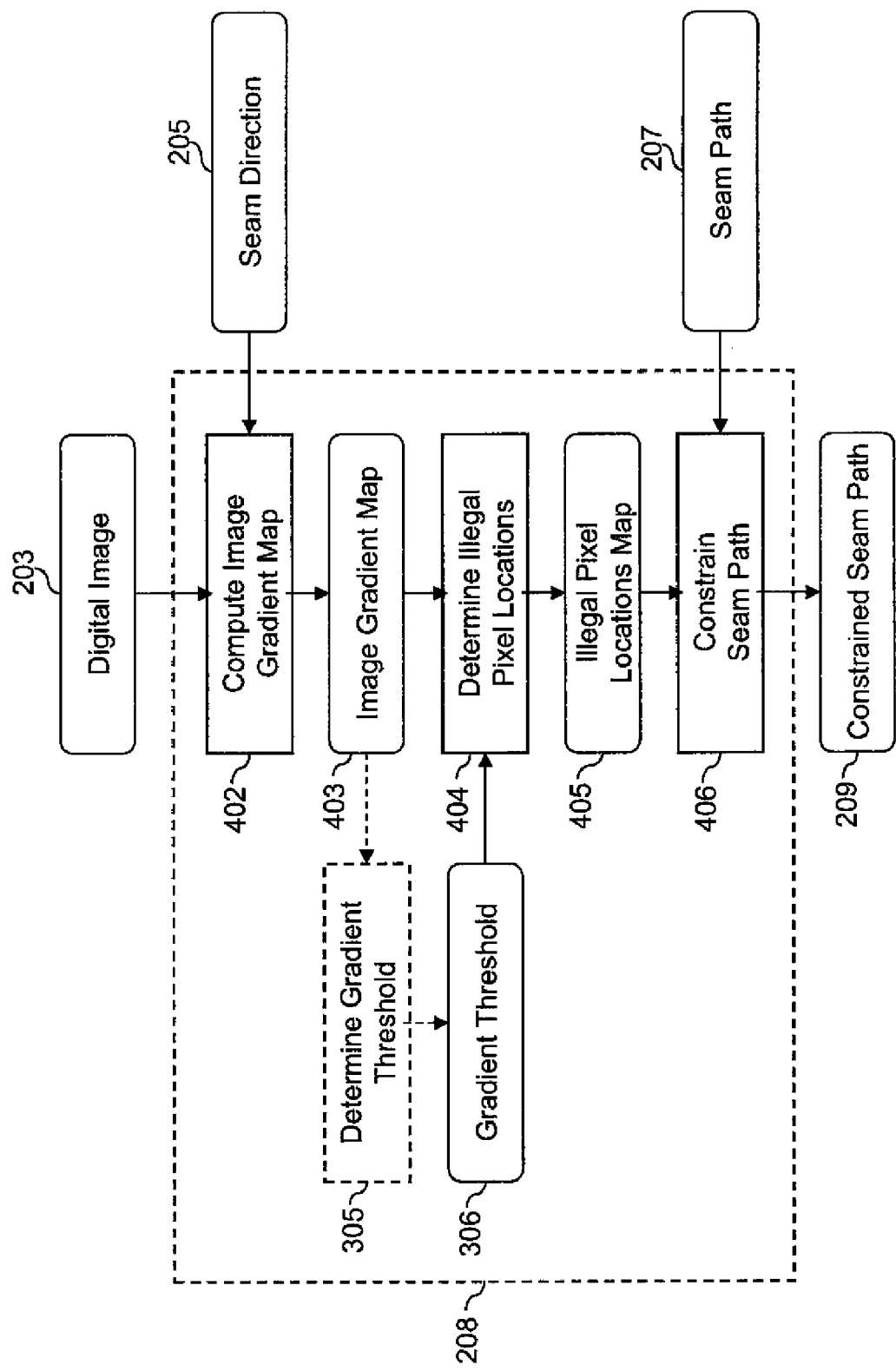
FIG. 4 is a block diagram showing a detailed view of the constrain seam path step of FIG. 2 for an alternate embodiment of the present invention.

The data processing system 110 includes one or more data processing devices that implement the processes of the various embodiments of the present invention, including the example processes of FIGS. 2-4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-4 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

FIG. 2 is a flow diagram illustrating a method for retargeting digital images according to an embodiment of the present invention. A digital image 203 representing a scene is received in receive digital image step 202. The digital image 203 can be captured by a digital camera or a scanner. Alternately, it may be a frame of a video sequence captured by a video camera.

Seam direction 205 is received in receive seam direction step 204. The seam direction 205 contains the information specifying whether a row or a column of the image will be removed. The compute seam path step 206 uses the seam direction 205 and the digital image 203 to compute a seam path 207. The constrain seam path step 208 imposes constraints on the seam path 207 to produce a constrained seam path 209. The constrain seam path step 208 is responsive to the digital image 203 and optionally to the seam direction 205. (Note that optional features shown in this and other figures are represented with dashed lines.) In the final step, the retarget image step 210 removes the pixels along the constrained seam path 209 to produce a retargeted digital image 211.

The individual steps outlined in FIG. 2 will now be described in greater detail. The compute seam path step 206 produces a seam path 207. In a preferred embodiment of the present invention, the seam path 207 is computed using a seam carving algorithm such as that described in U.S. Patent Application Publication 2008/0219587, by S. Avidan and A. Shamir, entitled "Method for retargeting images," which is incorporated herein by reference. With this approach, the seam path 207 represents a lowest-energy, connected path of pixels in the direction provided by seam direction 205. The energy of the seam path 207 is computed from an image energy map determined from the digital image 203.

The image energy map can be computed in any appropriate way known to those skilled in the art. In a preferred embodiment of the present invention, the image energy map is computed from the derivatives of the digital image 203 as described in the aforementioned U.S. Patent Application Publication No. 2008/0219587, and is given by:

$$Emap(x, y) = \left|\frac{\partial}{\partial x}I(x, y)\right| + \left|\frac{\partial}{\partial y}I(x, y)\right| \quad (1)$$

where (x,y) is the pixel location, I(x,y) is the pixel value of the digital image 203 at pixel location (x,y), $\partial/\partial x$ and $\partial/\partial y$ are the partial derivative operators in the x and y directions, respectively, |●| denotes absolute value operator, and Emap (x,y) is the value of the image energy map at pixel location (x,y). For the case where the digital image 203 is a color image, the image energy map is preferably determined using a luminance image determined from the digital image 203 using methods well known in the art.

In a preferred embodiment of the present invention, the energy associated the seam path of pixels is determined by summing up the image energy map values for the connected path of pixels that lie along the seam path.

$$E_S = \Sigma_S Emap(x_S, x_S) \quad (2)$$

where the summation is carried out for all of the points on a seam path 207, $(x_S, y_S)$ is the location of a point on the seam path 207, and $E_S$ is the seam path energy. The compute seam path step 206 determines the seam path 207 having the minimum seam path energy. This can be done using any optimization process known in the art, such as the optimization process described in the aforementioned U.S. Patent Application Publication No. 2008/0219587.

Generally, an initial point is selected on the boundary of the image as the starting location of the seam path 207. The seam path 207 is then extended from this point in the direction that minimizes the energy, crossing the digital image 203 in the seam direction 205 (FIG. 2). The initial point can be a predetermined point such as a corner point of the image a center point of the one of the edges. Alternately, the initial point can also be determined by selecting an edge location having a minimum energy, or corresponding to a row (column) of the image having the lowest average energy.

FIG. 3 is a more detailed view of the constrain seam path step 208 shown in FIG. 2 according to a preferred embodiment of the present invention. A compute seam path directional gradient step 302 uses the digital image 203 (FIG. 2) and the seam path 207 (FIG. 2) to compute a directional image gradient 303 perpendicular to the seam path 207, or alternately perpendicular to the seam direction 205. The directional image gradient can be computed in any appropriate way known to those skilled in the art. One way to compute the directional image gradient according to a preferred embodiment of the present invention can be described using Eq. (3) below:

$$e(x,y) = |I(x,y) - I(x',y')| \quad (3)$$

where (x,y) and (x',y') are neighboring pixel locations lying on a line perpendicular to the seam direction 205 (or the seam path 207), I(x,y) and I(x',y') are the pixel values of the digital image 203 (FIG. 2) at pixel locations (x,y) and (x',y'), respectively, |●| denotes absolute value operator, and e(x,y) is the value of the directional image gradient at pixel location (x,y).

In FIG. 3, the impose seam constraint step 304 uses the directional image gradient 303 and the seam path 207 to impose constraints on the seam path 207, producing the constrained seam path 209. In a preferred embodiment of the present invention, the impose seam constraint step 304 is implemented by constraining the directional image gradient to be less than a gradient threshold 306 for each pixel along the constrained seam path 209. The gradient threshold 306 is a threshold value specifying a maximum allowable value for the directional image gradient 303 along the constrained seam path 209.

The gradient threshold can be determined in any appropriate way known to those skilled in the art. In one embodiment of the present invention, the gradient threshold 306 is a predetermined constant. However, it has been found that in many cases, it is preferable for the gradient threshold 306 to be image dependent. A user interface can be provided allowing the user to specify a heuristically determined gradient threshold 306 that works best for a particular image. In a preferred embodiment of the present invention, a determine gradient threshold step 305 is used to determine the gradient threshold 306 responsive to the directional image gradient 303. This can be done by computing a cumulative distribution of the directional image gradient 303 and then selecting a gradient threshold 306 corresponding to a certain cumulative percentage (e.g., 80%). In this way, the constrained seam path 209 can be selected to avoid the areas of the digital image 203 that have the highest directional image gradient 303.

The impose seam constraint step 304 imposes the constraint condition that the directional image gradient 303 be less than the gradient threshold 306 along the constrained seam path 209. First, the seam path 207 determined by the compute seam path step 206 is checked to see if it violates the constraint condition. If the seam path 207 is found to satisfy the constraint condition, then the constrained seam path 209 is set to be equal to the seam path 207. However, if the seam path 207 is found to violate the constraint condition, then the seam path 207 is perturbed until a constrained seam path 209 is identified that satisfies the constraint condition. In one embodiment of the present invention, the seam path 207 is perturbed by adjusting the starting location for the seam path 207. If no constrained seam path 209 is identified that satisfies the constraint condition, then the gradient threshold 306 can be increased to ease the constraint condition until an acceptable constrained seam path 209 can be found.

The retarget image step 210 of FIG. 2 removes the pixels of the digital image 203 along the direction of the constrained seam path 209 produced by the constrain seam path step 208 to produce a retargeted digital image 211. In one embodiment of the present invention, the pixels along the constrained seam path 209 are simply removed and the remaining image pixels are shifted to close up the seam. However, this can result in visible artifacts along the seam in some cases. In a preferred embodiment of the present invention, the image pixels of the retargeted digital image 211 in a neighborhood near the image pixels on the constrained seam path 209 are modified using the values of the removed image pixels. The pixel values can be modified in any appropriate way known to those skilled in the art. In a preferred embodiment of the present invention, the pixels of the retargeted digital image 211 adjacent to the constrained seam path 209 are replaced by the average of the original image pixel values at those locations and the adjacent removed image pixel values.

FIG. 4 shows an alternate embodiment of the constrain seam path block 208 (FIG. 2). A compute image gradient map step 402 uses the digital image 203 and the seam direction 205 to compute an image gradient map 403 comprising a directional image gradient perpendicular to the seam direction 205 (or the seam path 207). The image gradient map 403 can be computed in any appropriate way known to those skilled in the art. In a preferred embodiment of the present invention, the directional image gradient given in Eq. (3) is used to compute the image gradient map 403.

Next, a determine illegal pixel locations step 404 uses the image gradient map 403 produced by compute image gradient map step 402 to determine an illegal pixel locations map 405. The illegal pixel locations can be computed in any appropriate way known to those skilled in the art. One way to compute the illegal pixel locations according to a preferred embodiment of the present invention can be described using the following equation:

$$IM(x, y) = \begin{cases} 0 & \text{if } e(x, y) \le \eta \\ 1 & \text{otherwise} \end{cases} \quad (4)$$

where e(x,y) is the image gradient map 403, $\eta$ is the gradient threshold 306, and IM(x,y) is the value of illegal pixel location map where IM(x,y)=0 indicates legal pixel locations and IM(x,y)=1 indicates illegal pixel locations. The gradient threshold 306 can be determined in any appropriate way known to those skilled in the art. As described above with reference to FIG. 3, in a preferred embodiment of the present invention a determine gradient threshold step 305 can be used to determine the gradient threshold 306 responsive to the image gradient map 403.

Next, a constrain seam direction step 406 uses the illegal pixel locations map 405 and the seam path 207 to determine the constrainted seam path 209. In a preferred embodiment of the present invention, the constrain seam path step 406 is implemented by constraining the seam path 207 to not pass through any illegal pixel locations.

The constrain seam path step 406 imposes the constraint that the constrained seam path 209 not pass through any illegal pixel locations. First, the seam path 207 determined by the compute seam path step 206 (FIG. 2) is checked against the illegal pixel locations map 405 to see if it violates passes through any illegal pixel locations. If the seam path 207 is found to satisfy the constraint condition, then the constrained seam path 209 is set to be equal to the seam path 207. However, if the seam path 207 is found to pass through any illegal pixel locations, then the seam path 207 is perturbed until a constrained seam path 209 is identified that does not pass through any illegal pixel locations. In one embodiment of the present invention, the seam path 207 is perturbed by adjusting the starting location for the seam path 207. If no constrained seam path 209 is identified that satisfies the constraint condition, then the gradient threshold 306 can be increased to ease the constraint condition until an acceptable constrained seam path 209 can be found.

The algorithm described above to modifying an input digital image 203 to form a retargeted digital image 211 where the number of rows or columns is reduced by one can be applied repeatedly to reduce the number of rows or columns until a desired output aspect ratio is reached. FIG. 5 shows an example of a source digital image 500. A retargeted digital image 510 is shown where the number of columns has been reduced by 40% according to the present invention. For comparison, a prior art retargeted digital image 520 is also shown determined according to the seam carving algorithm described in the aforementioned U.S. Patent Application Publication 2008/0219587. It can be seen that the present invention has the advantage that important details are persevered in the retargeted digital image 510 that have been lost in the prior art retargeted digital image 520.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 User interface system
140 Data storage system
202 Receive digital image step
203 Digital image
204 Receive seam direction
205 Seam direction
206 Compute seam path step
207 Seam path
208 Constrain seam path step
209 Constrained seam path
210 Retarget image step
211 Retargeted digital image
302 Compute seam path directional gradient step
303 Directional image gradient
304 Impose seam constraint step
305 Determine gradient threshold
306 Gradient threshold
402 Compute image gradient map step
403 Image gradient map

404 Determine illegal pixel locations step
405 Illegal pixel locations map
406 Constrain seam path step
500 Source digital image
510 Retargeted digital image
520 Prior art retargeted digital image

What is claimed is:

1. A method for modifying an input digital image having input dimensions defined by a number of input rows and input columns to form an output digital image where the number of rows or columns is reduced by one, comprising
   a) selecting either a horizontal seam direction to remove a row or a vertical seam direction to remove a column;
   b) determining an image energy map for the input image;
   c) defining a gradient threshold;
   d) determining a seam path responsive to the image energy map, where the seam path is constrained such that a directional image gradient computed in a direction perpendicular to either the seam path or the seam direction is less than the gradient threshold for each pixel in the seam path; and
   e) determining an output digital image by removing pixels along the seam path;
   wherein the method is performed at least in part using a data processing system.

2. The method of claim 1 where step e) includes modifying the output digital image pixels in a neighborhood near the seam path using the values of the removed pixels.

3. The method of claim 2 where the values of output digital image pixels adjacent to the seam path are replaced by the average of the original image pixel values and the adjacent removed image pixel values.

4. The method of claim 1 wherein the image energy map is computed by:

$$Emap(x, y) = \left|\frac{\partial}{\partial x}I(x, y)\right| + \left|\frac{\partial}{\partial y}I(x, y)\right|$$

where (x,y) is the pixel location, I(x,y) is the pixel value of the digital image at pixel location (x,y), $\partial/\partial x$ and $\partial/\partial y$ are the partial derivative operators in the x and y directions, respectively, |●| denotes absolute value operator, and Emap(x,y) is the value of the image energy map at pixel location (x,y).

5. The method of claim 1 wherein the gradient threshold is determined responsive to a distribution of directional image gradient values.

6. The method of claim 5 wherein the gradient threshold is determined such that a specified fraction of the directional image gradients in the distribution of directional image gradient values fall below the gradient threshold.

7. The method of claim 1 wherein the directional image gradient is computed in a direction perpendicular to the seam direction and step d) further includes:
   i) determining an image gradient map where the gradient is a directional image gradient computed in a direction perpendicular to the seam direction;
   ii) thresholding the image gradient map with the gradient threshold to determine illegal pixel locations; and
   iii) determining a seam path responsive to the image energy map, where the seam path does not pass through any illegal pixel locations.

8. The method of claim 1 wherein the input digital image is a color input digital image and the seam path is determined using a luminance image determined from the color input image.

9. A method for resizing an input digital image with an input aspect ratio to form an output digital image with an output aspect ratio where the method of claim 1 is applied repeatedly to reduce the number of input rows or input columns until the output aspect ratio is reached.

10. A system comprising:
    a data processing system; and
    a memory system communicatively connected to the data processing system and storing instructions configured to cause the data processing system to implement a method for modifying an input digital image having input dimensions defined by a number of input rows and input columns to form an output digital image where the number of rows or columns is reduced by one, wherein the instructions comprise:
    a) selecting either a horizontal seam direction to remove a row or a vertical seam direction to remove a column;
    b) determining an image energy map for the input image;
    c) defining a gradient threshold;
    d) determining a seam path responsive to the image energy map, where the seam path is constrained such that a directional image gradient computed in a direction perpendicular to either the seam path or the seam direction is less than the gradient threshold for each pixel in the seam path; and
    e) determining an output digital image by removing pixels along the seam path.

* * * * *